United States Patent
Ye et al.

(10) Patent No.: US 10,675,718 B2
(45) Date of Patent: Jun. 9, 2020

(54) METHOD AND DEVICE FOR REVERSIBLY ATTACHING A PHASE CHANGING METAL TO AN OBJECT

(71) Applicant: MAX-PLANCK-GESELLSCHAFT ZUR FÖRDERUNG DER WISSENSCHAFTEN E.V., Munich (DE)

(72) Inventors: Zhou Ye, Cupertino, CA (US); Guo Zhan Lum, Stuttgart (DE); Metin Sitti, Stuttgart (DE)

(73) Assignee: Max-Planck-Gesellschaft zur Forderung der Wissenschaften e.V. (DE)

( * ) Notice: Subject to any disclaimer, the term of this patent is extended or adjusted under 35 U.S.C. 154(b) by 607 days.

(21) Appl. No.: 15/428,786

(22) Filed: Feb. 9, 2017

(65) Prior Publication Data
US 2018/0021892 A1 Jan. 25, 2018

(30) Foreign Application Priority Data
Feb. 19, 2016 (EP) .................................. 16156570

(51) Int. Cl.
*B23K 1/00* (2006.01)
*B23K 35/26* (2006.01)
*B23K 35/00* (2006.01)

(52) U.S. Cl.
CPC ................ *B23K 35/26* (2013.01); *B23K 1/00* (2013.01); *B23K 35/001* (2013.01)

(58) Field of Classification Search
CPC . B23K 35/26; B23K 35/001; B23K 1/00–206
(Continued)

(56) References Cited

U.S. PATENT DOCUMENTS

| 4,863,090 A | * | 9/1989 | Lippey ................... B23K 20/16 228/116 |
| 5,007,163 A | * | 4/1991 | Pope ................... G01R 1/06783 228/123.1 |

(Continued)

FOREIGN PATENT DOCUMENTS

| CA | 2949391 A1 | * | 7/2017 | ........... B23K 26/354 |
| JP | 03106564 A | * | 5/1991 | |

OTHER PUBLICATIONS

Machine translation of JP-03106564A (no date available).*
(Continued)

*Primary Examiner* — Kiley S Stoner
(74) *Attorney, Agent, or Firm* — Dickinson Wright PLLC (57) ABSTRACT

A method for reversibly attaching a phase changing metal to an object, the method comprising the steps of:
  providing a substrate having at least one surface at which the phase changing metal is attached,
  heating the phase changing metal above a phase changing temperature at which the phase changing metal changes its phase from solid to liquid,
  bringing the phase changing metal, when the phase changing metal is in the liquid phase or before the phase changing metal is brought into the liquid phase, into contact with the object,
  permitting the phase changing metal to cool below the phase changing temperature, whereby the phase changing metal becomes solid and the object and the phase changing metal become attached to each other,
  reheating the phase changing metal above the phase changing temperature to liquefy the phase changing metal, and (Continued)

removing the substrate from the object, with the phase changing metal separating from the object and remaining with the substrate.

16 Claims, 6 Drawing Sheets

(58) Field of Classification Search
USPC ........ 228/179.1–180.22, 245–262, 119, 191, 228/264
See application file for complete search history.

(56) References Cited

U.S. PATENT DOCUMENTS

| | | | | |
|---|---|---|---|---|
| 5,234,149 | A * | 8/1993 | Katz | G01R 1/04 228/123.1 |
| 5,244,143 | A * | 9/1993 | Ference | B23K 1/20 228/180.21 |
| 5,417,362 | A * | 5/1995 | Chiyonobu | B23K 35/26 228/180.1 |
| 5,431,328 | A * | 7/1995 | Chang | H01L 24/10 228/106 |
| 5,611,481 | A * | 3/1997 | Akamatsu | B23K 35/26 228/180.22 |
| 5,845,837 | A * | 12/1998 | Gibbs | B21C 37/09 228/143 |
| 5,846,366 | A * | 12/1998 | Jin | H01L 21/4853 156/233 |
| 5,964,395 | A * | 10/1999 | Glovatsky | B23K 35/0222 228/123.1 |
| 6,015,083 | A * | 1/2000 | Hayes | B23K 3/0607 228/219 |
| 6,329,631 | B1 * | 12/2001 | Yueh | B23K 3/06 219/121.65 |
| 6,550,665 | B1 * | 4/2003 | Parrish | B23K 35/26 228/180.21 |
| 8,573,469 | B2 * | 11/2013 | Hu | H01L 33/405 228/179.1 |
| 8,794,501 | B2 * | 8/2014 | Bibl | H01L 33/04 228/179.1 |
| 9,761,542 | B1 * | 9/2017 | Sylvestre | H01L 23/562 |
| 2002/0142517 | A1 | 10/2002 | Maeda et al. | |
| 2002/0170944 | A1 * | 11/2002 | Baker | H01L 23/10 228/219 |
| 2003/0215981 | A1 * | 11/2003 | Strouse | B23K 35/26 438/118 |
| 2004/0129344 | A1 * | 7/2004 | Arita | B23K 35/0222 148/23 |
| 2005/0001019 | A1 * | 1/2005 | Goenka | B23K 1/008 228/233.2 |
| 2005/0150936 | A1 * | 7/2005 | Mackay | H01L 23/488 228/254 |
| 2006/0273138 | A1 * | 12/2006 | Lee | H05K 3/3415 228/101 |
| 2008/0087709 | A1 * | 4/2008 | Mackay | B23K 3/0623 228/49.5 |
| 2008/0166525 | A1 | 7/2008 | Swinnen et al. | |
| 2009/0001571 | A1 | 1/2009 | Mizuno et al. | |
| 2009/0181223 | A1 * | 7/2009 | Buchwalter | B23K 1/0016 428/198 |
| 2010/0116871 | A1 * | 5/2010 | Gruber | B23K 1/0016 228/244 |
| 2010/0224670 | A1 * | 9/2010 | Buchwalter | B23K 3/0638 228/102 |
| 2011/0068151 | A1 * | 3/2011 | Oh | B23K 1/0016 228/119 |
| 2011/0240716 | A1 * | 10/2011 | Zinn | B23K 1/0008 228/119 |
| 2013/0327811 | A1 * | 12/2013 | Dang | H01L 24/97 228/33 |
| 2014/0010991 | A1 * | 1/2014 | Sakurai | B23K 1/0016 428/137 |
| 2014/0318837 | A1 * | 10/2014 | Eifuku | H05K 3/361 174/257 |
| 2015/0231732 | A1 * | 8/2015 | Uzoh | H01L 23/10 228/194 |
| 2016/0212849 | A1 * | 7/2016 | Uemura | B23K 35/262 |
| 2016/0250719 | A1 * | 9/2016 | Tsuruta | B23K 35/262 428/463 |
| 2017/0274481 | A1 * | 9/2017 | Yoshikawa | B23K 35/26 |
| 2017/0354042 | A1 * | 12/2017 | Tsuruta | C09J 11/04 |

OTHER PUBLICATIONS

Extended European Search Report for European Application No. 16156570.0-1373 dated Jun. 30, 2016, 9 pages.
Michael D. Dickey et al., "Eutectic Gallium-Indium (EGAIn): A Liquid Metal Alloy for the Formation of Stable Structures in Microchannels at Room Temperature," Advanced Functional Materials, 2008, pp. 1097-1104, vol. 18, Wiley-VCH Verlag GmbH & Co. KGaA,Weinheim, Germany.

* cited by examiner

METHOD AND DEVICE FOR REVERSIBLY ATTACHING A PHASE CHANGING METAL TO AN OBJECT

The present invention relates to a method and a device for reversibly attaching a phase changing metal to an object.

Inspired by geckos, many synthetic bio-inspired adhesives employ intermolecular forces such as van der Waals forces to adhere strongly to a range of surfaces. These adhesives have impressive performance over a range of materials and conditions thanks to compliant micro- or nanostructures that increase their effective contact area. However, due to the nature of van der Waal forces, any deviation from a smooth and dry surface may impede adhesion. There have been developments in overcoming the challenges of wet and rough conditions, but these solutions tend to have a single adhesive state that requires a large detachment force. It is also known to enhance the controllability and functionality of reversible fibrillary adhesives by use of membrane inflation, magnetic deformation and functional fibre design. However, these designs tend to show significantly reduced adhesion, vulnerability to non-optimal conditions or a small maximum-minimum adhesion ratio. The present invention aims at overcoming these drawbacks.

It is in particular an object of the present invention to provide an improved method and also an improved device for reversibly attaching an adhesive to an objection in a controlled fashion.

The object is satisfied by a method in accordance with the features of claim 1 and by a device in accordance with the features of claim 14. Preferred embodiments of the present invention are described in the dependent claims.

The claimed method for reversibly attaching a phase changing metal to an object comprises the steps of:
- providing a substrate having at least one surface at which the phase changing metal is attached,
- heating the phase changing metal above a phase changing temperature at which the phase changing metal changes its phase from solid to liquid,
- bringing the phase changing metal into contact with the object, either when the phase changing metal is in the liquid phase or before the phase changing metal is brought into the liquid phase,
- permitting the phase changing metal to cool below the phase changing temperature, whereby the phase changing metal becomes solid and the object and the phase changing metal become attached to each other,
- reheating the phase changing metal above the phase changing temperature to liquefy the phase changing metal, and
- removing the substrate from the object, with the phase changing metal separating from the object and remaining with the substrate.

In the claimed method, the phase changing metal is employed as an adhesive with two adhesion states, namely a high adhesion state in the solid phase and a low adhesion state in the liquid state. The method in particular exploits the fact that the phase changing metal can be heated above its phase changing temperature where it is in the liquid state and, if brought into contact with or left in contact with the object can adhere to the object in the solid state. However, in contrast to known solders or brazes, the phase changing metal can be fully detached from the object if heated above the phase changing temperature.

The method in accordance with the present invention therefore allows the phase changing metal to be reversibly attached to the object in a controlled fashion, namely by controlling the phase change of the phase changing metal.

The wording "reversibly attached" can be understood in the sense that the method in accordance with the present invention allows an attachment as well as a detachment of the phase changing metal from the object.

The maximum adhesion is dependent on the roughness of the object's surface and also on other material properties. Nevertheless, tests on different flat surfaces and by use of Gallium as the phase changing metal have shown that reasonable adhesion values could be obtained in all conditions tested. Even under wet conditions reasonably strong adhesion values could be obtained.

The substrate can be used to handle the phase changing metal which is attached to a surface of the substrate. The substrate can in particular be used to bring the phase changing metal into contact with the object and to separate the phase changing metal from the object by removing the substrate from the object while the phase changing metal remains with the substrate. The substrate can be of the form of a post or a protrusion or a plurality of posts or protrusions and optionally be made of plastic, such as elastomer.

Preferably, the phase changing metal has the form of a droplet and is brought in this form into contact with the object. The phase changing metal can thereby be handled easily by use of the substrate, especially with a substrate in the form of a post or protrusion. Preferably, the phase changing metal also maintains the droplet form on the substrate's surface after it has been separated from the object. Thereby, it should be ensured that no material is left on the object. Thus, preferably all of the phase changing metal is separated from the object when the substrate is removed from the object.

The method can further comprise the step of exposing the phase changing metal to oxygen to allow the forming of an oxide layer as a surface layer of the phase changing metal. The oxide layer can help to keep the phase changing metal, when it is liquid, in a round or droplet shape, thereby imparting stiffness to the liquid phase changing metal. While the high stiffness of the solid phase changing metal provides a more equal load sharing at the contact interface, the oxide layer can be easily peeled from the object's surface, since the liquid phase changing metals tends to be highly deformable and the stress is concentrated at the edge of contact. As a result, the adhesion in the liquid low-adhesion state is much lower than in the high-adhesion state. Furthermore, the oxide layer can help to ensure that the phase changing metal can be completely removed from the object.

In an advantageous embodiment of the present invention, the phase changing temperature of the phase changing metal is above 27° C. or above 29° C. and, preferably, below 35° C. or 40° C. At room temperature ($\approx$25° C.), the phase changing metal is therefore in the solid state while it can be made liquid when the temperature is slightly raised, e.g. above 30° C. As the temperature difference between the two adhesion states is within less than 15° C., there is only a significant change in the mechanical properties when the phase changing metal changes its phase.

Preferably, the phase changing metal is Ga or a composition which comprises Ga, in particular eutectic GaIn. Ga melts at 29.76° C.

The invention also relates to using Ga or a Ga-composition as a phase changing metal in a method in accordance with the present invention.

When Ga is used as phase changing metal, the oxide layer consists of gallium oxide ($GA_2O_3$).

Preferably, the phase changing metal has a surface layer, in particular an oxide layer, and the phase changing metal is brought into contact with the object in such a way that the surface layer is in contact with the object. This ensures that the phase changing metal can easily be removed as a whole from the object's surface.

The method can further comprise the further step of restricting the contact pressure applied to the phase changing metal between the substrate and the object to a level ensuring the phase changing metal separates fully from the object. Restricting the contact pressure helps to prevent that the oxide layer being damaged or penetrated by surface asperities of the object. The undamaged oxide layer helps to ensure that the phase changing metal can be removed as a whole from the object.

The phase changing metal can be actively cooled below the phase changing temperature or it can be cooled only by exposure to the environment. An active cooling provides the advantage that the phase changing metal can be rapidly solidified after it has been brought into the liquid state. Passive cooling can also be advantageous because it does not cause any cost.

Preferably, the method comprises the further steps of:
providing the substrate and a reservoir of the phase changing metal in the liquid phase,
dipping at least the surface of the substrate into the reservoir, and
removing the substrate from the reservoir to obtain the substrate with the phase changing metal attached at the surface of the substrate.

The phase changing metal can be attached to the substrate's surface by bringing the liquid phase changing metal into contact with this surface and by letting the phase changing metal cool below the phase changing temperature so that the phase changing metal becomes solid and attaches to the surface of the substrate. Alternatively, since the phase changing metal already adheres to the substrate in the liquid phase, it can be transported in this liquid phase by the substrate to the object.

When the substrate is dipped into the reservoir, a pressure can be applied to the substrate to press the substrate against the reservoir and to damage an oxide layer at the reservoirs surface. Thereby, the bonding between the phase changing metal and the substrate's surface can be stronger.

The method can comprise the further step of using the substrate for handling the phase changing metal, in particular prior to attaching the phase changing metal to the object, while the phase changing metal is attached to the object, and/or to detach the phase changing metal from the object. The substrate can be employed as a carrier for the phase changing metal to which the phase changing metal remains attached.

The substrate can have an arbitrary form. Preferably, the substrate has the form of a post which is for example made of an elastomer.

Preferably, the substrate and the phase changing metal are not separated from each other, in particular after the phase changing metal has been brought into contact with the object and released from it again. The substrate and the phase changing metal can therefore be re-used, e.g. for an attachment to another object.

It is advantageous when the substrate and/or the object is/are selected such that in the liquid phase of the phase changing metal the bonding force between the phase changing metal and the object is smaller than the bonding force between the phase changing metal and the substrate. This helps to ensure that the phase changing metal sticks to the substrate and not to the object during and after the step of removing the substrate from the object.

The invention also relates to a device for reversibly attaching a phase changing metal to an object, the device comprising:
at least one phase changing metal, in particular in form of a droplet,
a heater for heating the phase changing metal above a phase changing temperature at which the phase changing metal changes its phase from solid to liquid, and
a handling installation comprising a substrate with at least one surface at which the phase changing metal is attached for bringing the phase changing metal, when the phase changing metal is in the liquid phase or before the phase changing metal is brought into the liquid phase, into contact with the object and for separating the phase changing metal from the object so that it remains with the substrate.

The heater can be integrated into the handling installation. Alternatively, the heater can be arranged or arrangeable in contact with the object, or directed at the object or at the substrate or at the droplet or the interface between the substrate and the object. The heater can be adapted to provide at least one of the following: surface heating, electric heating, inductive heating. The heater can be a laser or another light source which can be directed to the phase changing metal. The heater can be a Peltier element that may also be used as a cooler for cooling the phase changing metal (by reversing the direction of current flow through the element). The device can comprise a separate cooler.

The heater can be adapted to avoid an overheating of the phase changing metal above a predetermined temperature which is higher than the phase changing temperature.

Preferably, the handling installation is adapted to automatically bring the phase changing metal into contact with the object, and/or to automatically separate the phase changing metal from the object, in particular in response to re-liquefying (melting) of the phase changing metal. The handling installation can, for example, comprise an arm of a robot which holds and moves the substrate with the phase changing metal to and from the object and optionally also moves the object when attached to the substrate into another location.

The method and/or device in accordance with the present invention can enable applications requiring strong, reversible, and robust adhesion, on a wide range of smooth and rough surfaces, under dry or wet conditions. These applications may include transfer printing, reconfigurable and climbing robots, placement of electronic components on circuit boards, electronic packaging, product design, and biomedicine.

The invention will be described in detail in the following with reference to embodiments shown in the accompanying drawings and by way of example only. In the drawings, there are shown.

Figure 1A:
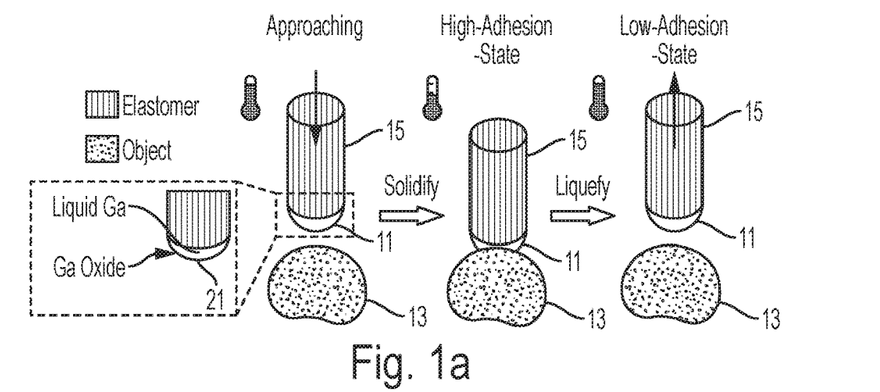
FIG. 1a is an illustration used to described a method for reversibly attaching a phase changing metal to an object in accordance with the present invention.
Figure 5A:
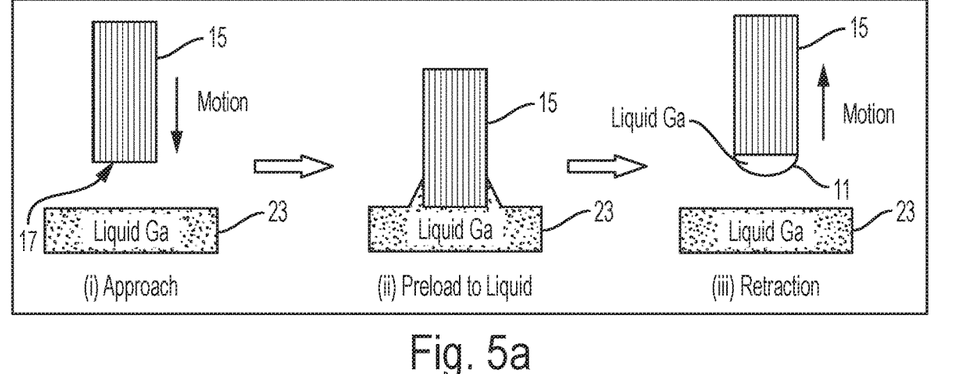
FIG. 5a illustrates a systematic way to attach a liquid Ga layer to a post.
Figure 5B:
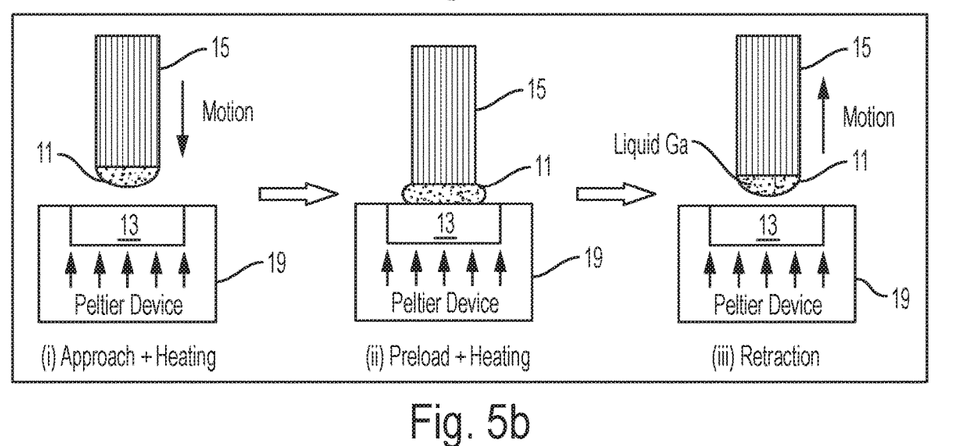
FIG. 5b illustrates a procedure to measure the adhesion for a low-adhesion state of a Ga droplet.
Figure 5C:
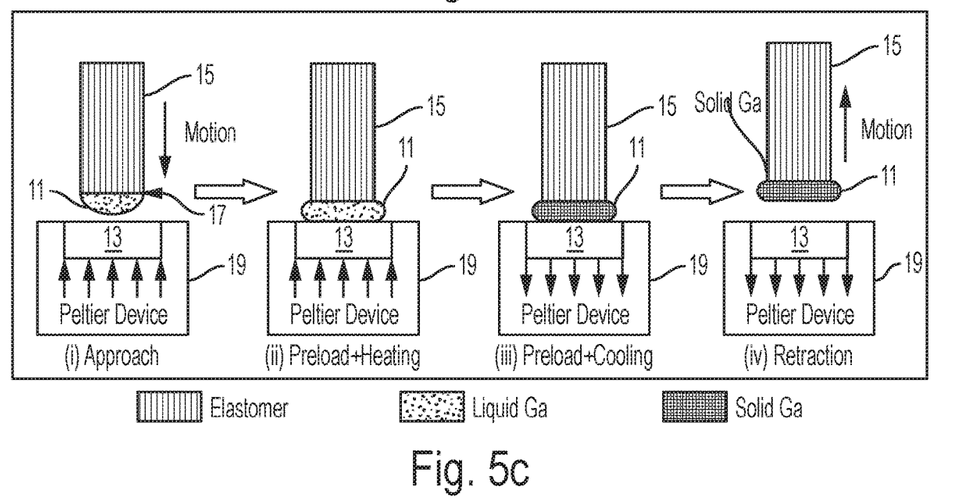
FIG. 5c illustrates a procedure to measure the adhesion for the high-adhesion state.

As shown in FIGS. 1a and 5c, a preferred embodiment of the method in accordance with the present invention for reversibly attaching a phase changing metal 11 (gallium) to an object 13 includes the step of providing a substrate 15 which is in this example a post made of an elastomer, in this case PDMS, and which has a surface 17 (see FIG. 5a (i) and FIG. 5c (i)) at which the phase changing metal 11 is attached.

The substrate 15 is moved towards an object 13 such that the phase changing metal 11 comes into contact with the object 13. Before the phase changing metal 11 gets into contact with the object 13, it is heated above a phase changing temperature at which the phase changing metal changes its phase from solid to liquid. For Ga this phase changing temperature is about 30° C. The phase changing metal 11 can also be heated above the phase changing temperature after it has come into contact with the object 13. This is for example done when a heater 19 is arranged in contact with the object 13 as shown in FIG. 5c. There, the heater 19 is a Peltier device arranged below the object 13.

In a further step, the phase changing metal 11 is permitted to cool below the phase changing temperature, whereby the phase changing metal 11 becomes solid and the object 13 and the phase changing metal 11 become attached to each other (see FIGS. 5c (ii) and (iii)). The phase changing metal 11 can be actively cooled, for example in the setup of FIG. 5c by the Peltier device 19.

Alternatively, the phase changing metal 11 can be cooled only by exposure to the environment. This is in particular possible when the phase changing metal 11 is Gallium which is solid at room temperature (25° C.) and liquid slightly above room temperature, namely when heated above 30° C.

In further steps, the phase changing metal 11 is reheated above the phase changing temperature to liquefy the phase changing metal 11, and the substrate 15 is removed from the object 13, with the phase changing metal 11 separating from the object 13 and remaining with the substrate 15.

Preferably, prior to the step of providing the substrate 15 with the phase changing metal 11 attached thereto, the phase changing metal 11 can be exposed to oxygen (or to air) to allow the forming of an oxide layer 21 (see FIG. 1a) at the surface of the phase changing metal 11. The oxide layer 21 forms a protective layer and stabilizes the droplet form of the phase changing metal 11 when it is in the liquid state. The phase changing metal 11 is preferably brought into contact with the object 13 in such a way that the oxide layer 21 enters into contact with the object 13. This helps to ensure that the phase changing metal 11 can be completely separated from the object 13 when the substrate 15 is removed from the object 13 while the phase changing metal 11 is in its liquid state.

The method can further comprise the step of restricting the contact pressure applied to the phase changing metal 11 between the substrate 15 and the object 13 to a level ensuring the phase changing metal 11 separates fully from the object 13. By restricting the contact pressure, a damage of the oxide layer 21 at the surface of the phase changing metal 11 can be prevented. This can help to ensure that the phase changing metal 11 can be separated completely from the object 13.

As illustrated in FIG. 5a, the method can further comprise the step of providing the substrate 15 and a reservoir 23 of the phase changing metal 11 in the liquid phase (see FIG. 5a (i)). At least the surface 17 of the substrate 15 is dipped into the reservoir 23 so that the phase changing metal 11 can attach to the surface 17. A predetermined pressure can be applied to press the substrate 15 into the reservoir (see FIG. 5a (ii)). This can help to damage, penetrate or locally disperse an oxide layer at the surface of the reservoir 23. Thereby, the bonding between the surface 17 and the liquid metal 11 can be improved. The substrate 15 is then removed from the reservoir 23 to obtain the substrate 15 with the phase changing metal 11 being attached at the surface 17 (see FIG. 5a (iii)).

The substrate 15 is used for handling the phase changing metal 11, in particular prior to attaching the phase changing metal 11 to the object 13, while the phase changing metal 11 is attached to the object 13, and/or to detach the phase changing metal 11 from the object 13. Thus, the substrate 15 can be regarded as a carrier from which the phase changing metal 11 is not detached. The substrate can also be used for movement of the attached object from one location to another.

In order to ensure that the phase changing metal 11 remains with the substrate 15 and completely separates from the object 13 when the substrate 15 is removed from the object 13, the substrate 15 and/or the object 13 is/are selected such that in the liquid phase of the phase changing metal lithe bonding force between the phase changing metal 11 and the object 13 is smaller than the bonding force between the phase changing metal 11 and the substrate 15. For example, the surface 17 of the substrate 15 could be smoother than the surface of the object 13 resulting in a larger bonding force between the phase changing metal 11 and the substrate 15.

The described method can be employed in a preferred embodiment of a device in accordance with the present invention for reversibly attaching a phase changing metal 11 to an object 13. The device comprises at least one phase changing metal 11, such as Ga, a heater 19 for heating the phase changing metal 11 above a phase changing temperature at which the phase changing metal 11 changes its phase from solid to liquid, and a handling installation comprising a substrate 15 with at least one surface 17 at which the phase changing metal 11 is attached for bringing the phase changing metal 11, when the phase changing metal 11 is in the liquid phase or before the phase changing metal 11 is brought into the liquid phase, into contact with the object 13 and for separating the phase changing metal 11 from the object 13 so that it remains with the substrate 15.

The invention is further described in the following by way of example and in the words of the inventors:

Here, we use the reversible adhesive characteristics of Ga-based liquid metal coatings to meet these challenges. Although one group has previously quantified the small adhesion values associated with a droplet of liquid Ga-based alloys, the feasibility of using the phase change of Ga to achieve reversible adhesive properties and high switchability has neither been explored nor demonstrated. By controlling the phase change of Ga, we show that Ga can be employed as a new strong and robust adhesive with two adhesive states, a high-adhesion state and a low-adhesion state.

For the high-adhesion state, an object (substrate 15) coated with liquid Ga (phase changing metal 11) is brought into contact with another object (object 13) while the temperature of the system is elevated to ensure that the Ga layer remains in the liquid phase. After the Ga (phase changing metal 11) has established good contact with the other object (object 13), the temperature is decreased, solidifying the Ga (phase changing metal 11) and causing the surfaces to "bond" with a force we refer to as the "maximum adhesion". In the low-adhesion state, the Ga layer (phase changing metal 11) is melted, reducing the force required to separate the two surfaces, deemed the "minimum adhesion". Thus, the objects 13, 15 can be easily separated (see FIG. 1a).

In our experiments, the temperature was raised to 31° C. at the low-adhesion state, while decreased to 23° C. at the high-adhesion state. As the temperature difference between the two adhesion states is within 10° C., there is only a significant change in mechanical properties when Ga (phase changing metal 11) changes its phase.

In the presence of air, a layer of gallium oxide ($Ga_2O_3$) (see oxide layer 21 in FIG. 1a) surrounds the surface of the liquid Ga (phase changing metal 11) and maintains its round shape, imparting to the droplet a small but functional stiffness. While the high stiffness of the solid Ga provides more equal load sharing at the contact interface, the oxide layer (oxide layer 21) of liquid Ga (phase changing metal 11) can easily be peeled from an object's surface, since the liquid is highly deformable and the stress is concentrated at the edge of contact. As a result, the adhesion in the liquid low-adhesion state is much lower than in the solid high-adhesion state. We use the maximum-minimum adhesion ratio, henceforth referred to as the switching ratio, to quantify this adhesion difference. The adhesion in each state was determined by measuring the corresponding pull-off force of Ga-coated PDMS posts (corresponding to substrate 15 in FIGS. 1 and 5) from a substrate (corresponding to object 13 in FIGS. 1 and 5). For ease of measurement in the low-adhesion state, the Ga (phase changing metal 11) was kept in the liquid state throughout the measurements (see FIG. 5b). Although the phase of Ga did not change from solid to liquid in these measurements, similar adhesion and mass transfer results were observed when this phase change occurred.

Both the maximum adhesion and the switching ratio were highly dependent on the roughness and other material properties of the substrate. Consequently, tests on different flat surfaces using a 1.75-mm-diameter PDMS post (see substrate 15 in FIG. 1a) revealed a range of adhesion values and switching ratios (see FIG. 1b); however, in all conditions tested, the Ga showed strong maximum adhesion (dry conditions: 35.6-106 mN, wet conditions: 15.2 mN) with a high switching ratio (dry conditions: 33.4-178, wet conditions: 18). While some other adhesive techniques have high switching ratios (e.g. 35, 40, 204), most are limited to smooth and dry conditions. Conversely, those solutions targeting challenging conditions, such as wet or rough surfaces, rarely possess multiple adhesive states. Recent pioneering adhesives that can achieve two adhesive states in underwater conditions (ratio: 15) are unable to easily switch between these states during adhesion. Furthermore, these adhesives have moderate switching ratios (18) and low maximum adhesion under dry conditions (11 mN).

For smooth and dry surfaces, the Ga layer (phase changing metal 11) made full contact with the substrate (corresponding to object 13) in both high- and low-adhesion states, yielding strong maximum adhesion (e.g. 106 mN) and a high switching ratio (e.g. 79.3). In general, higher maximum adhesion (57.7-106 mN) and switching ratios (33.4-86.1) have been observed for smooth surfaces like gold, <100> silicon, glass (root-mean-square (RMS) roughness: 3.17 nm), and PEG-diacrylate hydrogel (see FIG. 1b (iii)).

Rough glass with an RMS roughness of 582 nm still showed high maximum adhesion and a high switching ratio under dry conditions, despite significantly reduced performance in most of their bio-inspired counterparts. The maximum adhesion and switching ratio are found to be 35.6 mN and 178, respectively. While effective, the maximum adhesion is observed to be approximately 50% of that on smooth glass (FIG. 1b (ii)). This reduced adhesion may be explained by Ga's inability to fully conform to the surface asperities due to the stiffness of its oxide layer. Such stiffness lowers the effective contact area on rough surfaces, which lowers the intermolecular forces between the objects.

Figure 1B:
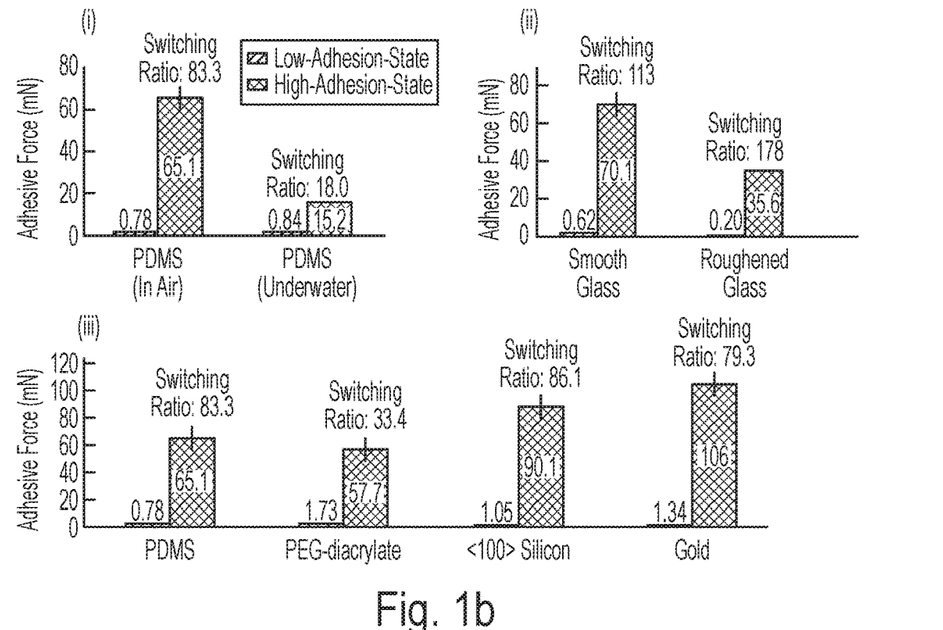
FIG. 1b shows experimentally determined adhesion and switching ratios.

Significant adhesion and switching behavior could even be observed underwater (FIG. 1b (i)). On a smooth PDMS surface, we found a maximum adhesion of 15.2 mN and a switching ratio of 18 (compared to literature values of 11 mN and 15, respectively). Despite these strong adhesive properties, this does still represent a reduction in performance when compared with previous experiments conducted under dry conditions: both the maximum adhesion and switching ratio were reduced by a factor of 4. This behavior may be attributed to a change in the effective Hamaker constant or the properties of the Ga-water interface. Water alters the composition of the oxide, lowering both its elastic modulus and yield stress, and may create a slip layer between the substrate (corresponding to object 13 in FIGS. 1 and 5) and the Ga (phase changing metal 11), preventing flat-flat contact.

Figure 1C:
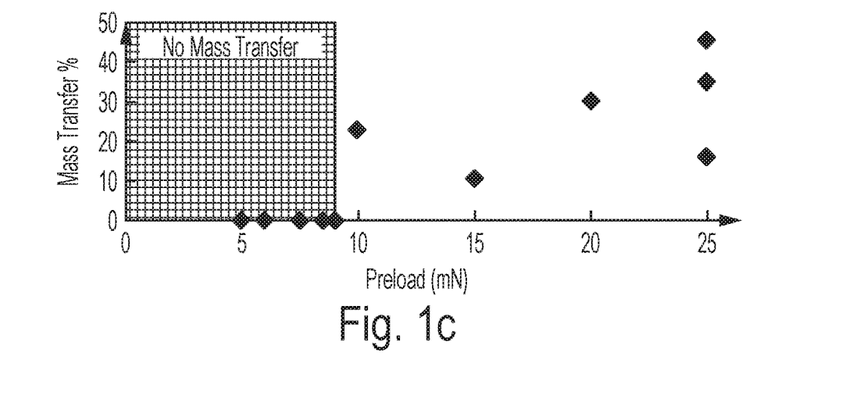
FIG. 1c shows the percentage of the total mass of Ga droplet transferred in the low-adhesion state resulting from various preloads.

To ensure the reversibility of the method, it was also critical to eliminate any significant mass transfer to the substrate (corresponding to the object 13 in FIGS. 1 and 5) throughout the low-adhesion state. The low-adhesion state experiments were repeated for varying preloads, revealing a critical maximum preload of 3.7 kPa (corresponding to 9 mN for a 1.75-mm-diameter post), above which significant mass transfer occurred (FIG. 1c). For small preloads, there was no mass transfer because the liquid Ga (phase changing metal 11) remained contained within the elastic oxide layer (oxide layer 21), but for large preloads, the oxide layer likely ruptured and reformed around the surface. This caused closer contact with the substrate, which increased adhesion to the substrate—larger than the cohesion within the liquefied metal—and resulted in significant mass transfer to the surface. This phenomenon may also explain the preferential adhesion of the Ga to the post (corresponding to the substrate 15 in FIGS. 1 and 5) instead of the substrate (corresponding to the object 13 in FIGS. 1 and 5), since the oxide layer was intentionally broken during the application of the Ga layer to the post.

Figure 2A:
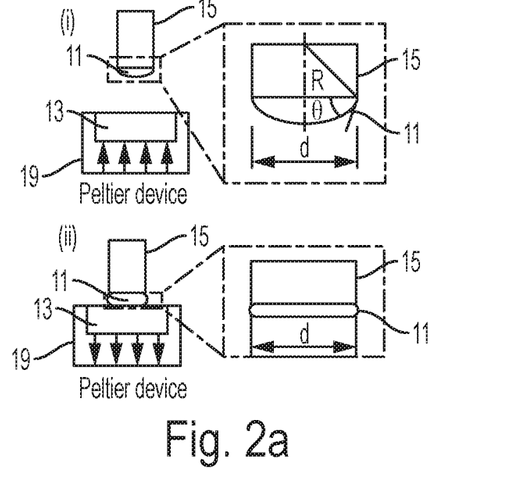
FIG. 2a shows a configuration and variables applied to an adhesive model.
Figure 2B:
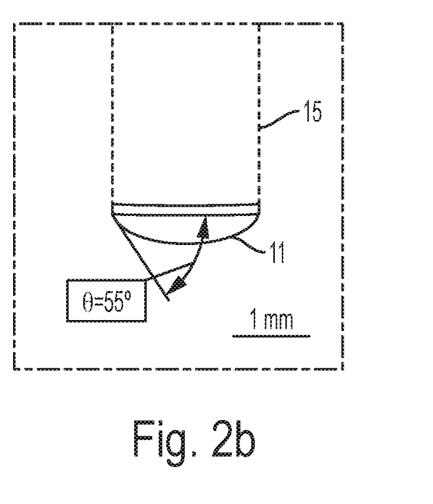
FIG. 2b shows an image, from which an angle of 55° between a Ga droplet and a substrate is measured.
Figure 2C:
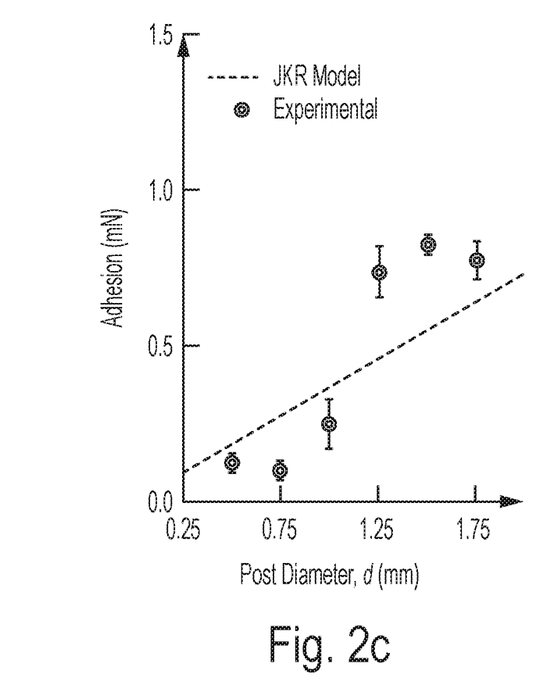
FIG. 2c shows a graph which depicts the minimum adhesion for Ga-coated posts of various diameters together with a fitted curve derived from a JKR model.

The large switching ratio could be induced by the change in contact mechanics when Ga (phase changing metal 11) changes its phase. Thus, we introduce a simple two-part model that can briefly describe for this change. We consider the Ga oxide layer (layer 21) as a solid elastic membrane that functions like a dry adhesive, allowing us to apply the Johnson-Kendall-Roberts (JKR) model of elastic contact to approximate the low-adhesion state. Assuming the Ga droplet (phase changing metal 11) to be an incompressible elastic hemisphere (see FIG. 2a), the minimum adhesion, $F_{min}$, can be expressed as a function of the effective work of adhesion, $\omega_f$, between the Ga oxide layer (layer 21) and the substrate (corresponding to object 13 in FIG. 2a):

$$F_{min} = 1.5 \omega_f \pi R, \quad (1)$$

where R is the Ga layer's radius of curvature, approximated by $R = d/(2 \sin \theta)$ where d is the post diameter and $\Theta$ is the angle formed between the Ga and the substrate (55°) (see FIG. 2b). By fitting this model to the experimental data (see FIG. 2c), the overall interfacial work of adhesion is estimated to be 127 mJ/m².

When the Ga (phase changing metal 11) is solidified in the high-adhesion state, it conforms to the roughness of the substrate (substrate 15, object 13) as closely as the oxide layer (layer 21) allows. For simplicity, we assume this implies perfect contact with the substrate. With this assumption of perfect contact, we can model the high-adhesion state as a circular flat punch in contact with a flat substrate, where the maximum adhesion, $F_{max}$, is:

$$F_{max} = \sqrt{\pi d^3 K \omega_f}, \quad (2)$$

where K is the effective Young's modulus[25]:

$$K = \left( \frac{1 - v_1^2}{E_1} + \frac{1 - v_2^2}{E_2} \right)^{-1}, \quad (3)$$

$E_1$ and $v_1$ are the Young's modulus and Poisson's ratio of Ga in the solid state (9.3 GPa, 0.47), and $E_2$ and $v_2$ are the Young's modulus and Poisson's ratio of the PDMS surface (1.3 MPa, 0.5). Although the failure for both states is adhesive (not cohesive), the contact mechanics that result from the differences in contact shape justify the use of these two models.

Figure 2D:
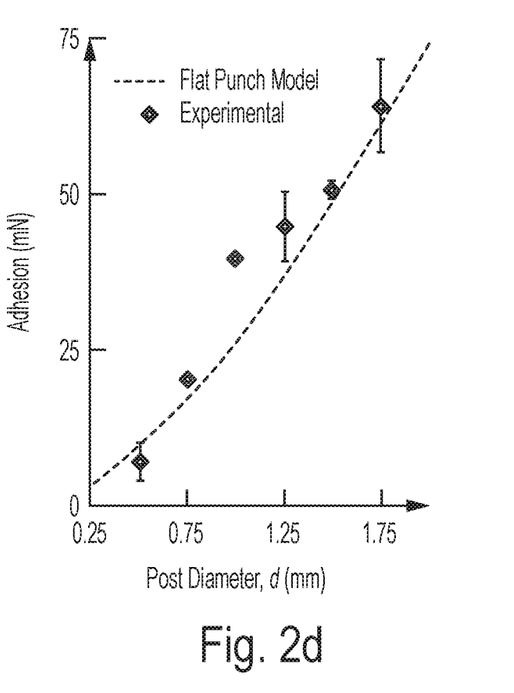
FIG. 2d shows a graph which depicts the maximum adhesion for Ga-coated posts of various diameters together with a non-fitted curve from a non-fitted punch model.

Without further fitting experimental data, the flat punch model matches well the relationship between post diameter (diameter of substrate 15) and maximum adhesion found in the experiments (FIG. 2d). Although there is greater spread in the data for the low-adhesion state (FIG. 2c), the JKR model can still approximately describe the positive correlation between the post diameter and the minimum adhesion. The presented two-part model is a preliminary study that provides a simple discussion of the reversible adhesive properties of Ga.

We also designed several demonstrations to exhibit the relevance of our method to reversible adhesion applications like microrobotics and transfer printing.

Figure 3A:
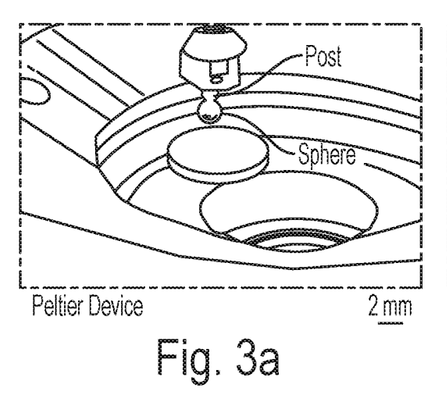
FIG. 3a is a picture from a proof of concept demonstration.
Figure 3B:
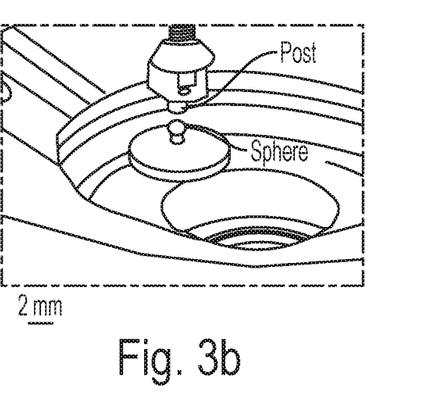
FIG. 3b is a further picture from a proof of concept demonstration.

As shown in FIG. 3, we were able to use a post (being a substrate in the wording of claim 1) to pick-and-place a non-planar substrate (an acrylic sphere, being an object in the wording of claim 1) by bonding the Ga layer to the object, using an automatic stage to transport it, and releasing it at a desired location. Additionally, a similar manipulation was performed using a miniature magnetic robot that was coated with Ga and controlled by external magnetic fields. The speed of these demonstrations was hampered by the low thermal conductivity of the setup, but could be accelerated by improving the system in the future. Lastly, we also show that the adhesion performance of Ga can be further improved by utilizing special enclosing structures with a Ga-to-Ga interface (see FIG. 7).

The results of this study show that the proposed method could enable applications requiring strong, reversible, and robust adhesion, on a wide range of smooth and rough surfaces, under dry or wet conditions. These applications may include transfer printing, reconfigurable and climbing robots, electronic packaging, product design, and biomedicine. Characterizing Ga's other properties, such as its compatibility with biological tissues, and examining scaling laws (e.g. Ga layer deposited on microfiber tips) are future works. We will also investigate the possibility of using the proposed adhesive mechanism on other materials as future works.

EXPERIMENTAL SECTION

Fabrication of Sample: Molds were created by drilling acrylic squares with bits ranging from 0.5 mm to 1.75 mm. Posts (in particular used as substrates 15) were then cast using PDMS (Sylgard® 184, Dow Corning, 10:1 ratio), with a backing layer of 2.8 mm. The samples were degassed and cured at 60° C. for 12 hours. The Ga (99.99% pure Ga, Rotometals) was melted at 34° C. Each post (substrate 15) was dipped into the liquid metal (see reservoir 23) with a large enough preload to break the oxide layer (see FIG. 5a (ii)). The Ga solidified and a new oxide layer formed around the droplet 11 in the ambient air.

Figure 4:
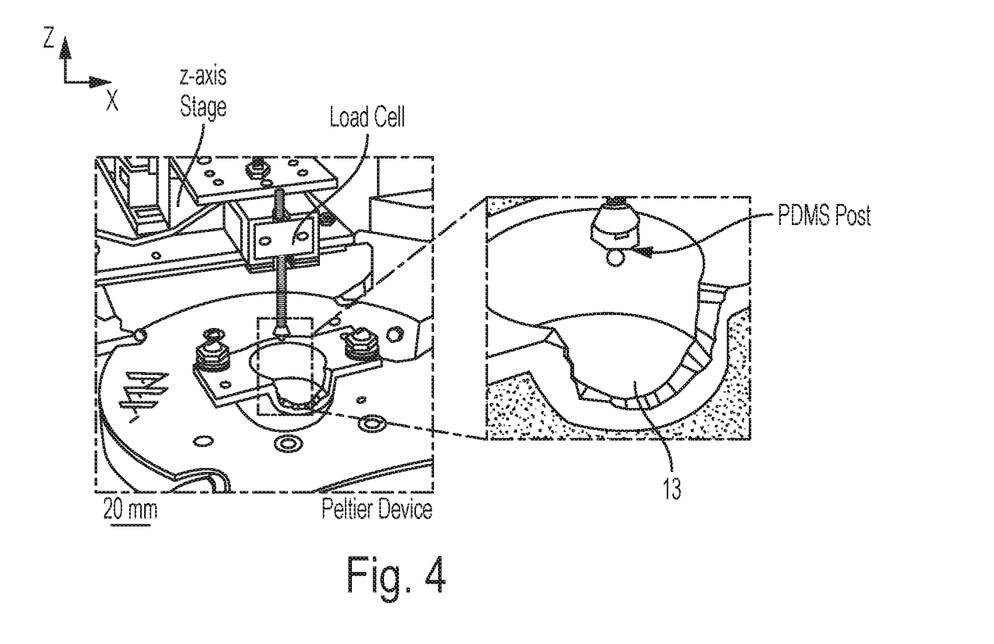
FIG. 4 shows two photos from an experimental setup to perform adhesion tests.

Experimental Setup and Procedures: The Ga post (substrate 15 with metal 11) was attached to a load cell (GSO-30, Transducer Techniques) above the flat object 13 (see FIG. 4). It was actuated vertically by an automatic stage, and the substrate was heated and cooled by a Peltier device (HM-CIS, ALA Scientific Instruments), controlled by a one-channel bipolar temperature controller (HCT-10, ALA Scientific Instruments) (see FIG. 4).

The post was touched to the heated object (31° C.) at a slow speed (20 µm/s) to allow viscoelastic effects to be neglected and prevent the formation of voids at the interface. Contact was maintained for 30 s to ensure the complete melting of the Ga layer. A preload of 3.5 kPa (corresponding to 8.33 mN for a 1.75-mm-diameter post) was used for PDMS surfaces, and 2.1 kPa (5 mN) for other materials.

In the high-adhesion state, the temperature was then reduced to 23° C. over 6 min, solidifying the Ga, and the post was retracted from the surface at a speed of 0.2 mm/s. The adhesion was measured over three trials. Because Ga expands during solidification, the vertical displacement of the post was adjusted to maintain the preload force throughout both state changes. In the low-adhesion state, the temperature was maintained for 30 s longer, and the post was retracted at a speed of 0.2 mm/s. The adhesion was measured over 20 trials. See FIG. 5 for the experimental procedures.

Adhesion measurements in both states were conducted on different flat substrates (corresponding to the object 13 in FIG. 5): PDMS, smooth glass (borosilicate glass, RMS roughness: 3.17±0.287 nm, Fisherbrand™ Cover Glasses), rough glass (RMS roughness: 582±3.17 nm, Fisherbrand™ Frosted Microscope Slides), hydrogel (PEG-diacrylate, MN=700, Sigma-Aldrich), silicon (<100> p-type wafer, University Wafer), and gold. The photoinitiator for the hydrogel was 2,2-Dimethoxy-2-Phenylacetophenonone 99% (Sigma-Aldrich), mixed with a weight ratio of 15 wt %. The monomer and the photoinitiator were mixed with a vortex mixer for 2-3 minutes, and with a sonicator for 1 hour, before molding and UV photopolymerization. For the gold substrate, a flat cylindrical glass slide (D=5 mm; Edmund Optics) was coated via thermal evaporation with a Cr/Au bilayer (5 nm; 30 nm; 0.2 Å s$^{-1}$). The RMS roughness of both the smooth and roughened glass was measured using an Asylum MFP-3D atomic force microscope (see FIG. 6). On the PDMS substrate, the experiments were also repeated for different post diameters to study the effect of post size on adhesion.

For the underwater experiments, a drop of deionized water was placed on a PDMS substrate (being the object), and the Ga-coated post was lowered through this droplet, contacting the substrate (corresponding to the object in the wording of claim 1) while fully submerged.

Additional low-adhesion-state experiments were performed on a flat, smooth PDMS substrate (being the object in the wording of claim 1) in which the preload force was varied from 1 mN to 25 mN. The mass of the setup, including the layer of Ga, a 1.75-mm-diameter post, and a screw, were measured before and after each trial to quantify the mass transfer to the substrate. These results were used to determine the appropriate preload for adhesion experiments.

FIG. 1a illustrates a method of reversibly attaching an elastomer post 15 coated with a liquid metal (Ga) layer 11 to another surface (of the object 13). An elastomer post 15 is coated with a layer of liquid Ga 11, which reacts with air, forming a membrane 21 of solid Ga oxide (Ga$_2$O$_3$) that prevents mass transfer when Ga is in the liquid phase. To initiate the maximum adhesion, the post 15 is placed in contact with an object 13 and cooled, causing the Ga to solidify around the object's surface. To detach from the surface with minimum adhesion, the Ga layer 11 is heated and liquefied, allowing the object 13 to be easily released. The difference in adhesion between the solid and liquid conditions enabled a reversible adhesive with a large switching ratio. Note that the elastomer post 15 can be replaced by other shapes if desired.

FIG. 1b shows the experimentally determined adhesion and switching ratios associated with each flat substrate material. The experiments are conducted with a 1.75-mm-diameter post (substrate 15) under a preload of 8.33 mN for the PDMS surface, and 5 mN for the other surfaces. The high bars represent the mean maximum adhesion with error bars over 3 trials, while the low bars represent the mean minimum adhesion with error bars over 20 trials. The switching ratio is the ratio between the maximum adhesion and the minimum adhesion.

FIG. 1b (i): Adhesion on smooth PDMS surface under dry and wet conditions.

FIG. 1b (ii): Adhesion on smooth and roughened glass surfaces under dry conditions. The RMS roughness of the smooth and roughened glass surfaces are 3.17 nm and 582 nm, respectively.

FIG. 1b (iii): Adhesion on smooth surfaces made of different materials under dry conditions.

FIG. 1c shows the percentage of the total mass of the Ga droplet transferred in the low-adhesion state resulting from various preloads, tested on a flat, smooth PDMS object 13 with a 1.75-mm-diameter PDMS post 15. Below 9 mN (corresponding to 3.9 kPa for the 1.75-mm post) no mass transfer was observed. Above 10 mN, there was significant mass transfer. Each data point represents 20 trials for preload below 9 mN and 1 trial for preload above 10 mN.

FIG. 2 shows the experimental data and modelling parameters for the high- and low-adhesion states. In particular, FIG. 2a shows the configuration and the variables applied to the adhesive model. To illustrate the variables clearer, we show them before the Ga-coated post 15 came into contact with the substrate. For the detail measuring procedure for both the high-adhesion and low-adhesion states, please see FIG. 5.

FIG. 2a (i) shows the liquid Ga droplet 11 during the low-adhesion state, illustrating the parameters employed for the JKR model: d is the diameter of the post, Θ is the angle formed between the Ga 11 and the substrate 15, and R is the radius of curvature.

FIG. 2a (ii) shows the solidified Ga in the high-adhesion state, where d represents the diameter of the post 15 (and thus the solid Ga) for the flat punch model. Different colors of Ga are used in (i) and (ii) to distinguish Ga in its different adhesive states, and do not indicate any real physical change in color for Ga.

FIG. 2b shows an image from which an angle of 55° between the Ga and the substrate is measured.

FIG. 2c: The minimum adhesion for Ga-coated posts of various diameters (where each data point represents 20 trials) with the fitted JKR model.

FIG. 2d: The maximum adhesion for Ga-coated posts of various diameters (where each data point represents 3 trials) and the non-fitted flat punch model. The data is gathered for a preload pressure of 3.5 kPa on a flat, smooth PDMS substrate. The minimum adhesion varied between 0 and 1 mN, and the adhesion in the high-adhesion-state varied between 6 and 65 mN, yielding an average switching ratio of 105.

Supplementary Information:

Enhancing adhesion performance of objects by employing enclosing structures with a Ga-to-Ga interface:

In the experiments, we observed that the maximum adhesion is limited by the minimum force required to peel the Ga adhesive from the surface. Therefore, in specific cases where we can apply specially designed structures that can prevent Ga from peeling off, the maximum adhesion of Ga is expected to increase. To demonstrate such a concept, we designed the enclosing structures in such a way that they consist of a wide reservoir, narrowing to 1.75-mm neck to enclose the solid Ga in a compartment and prevent it from peeling off (see FIG. 7). When we solidify the Ga while these structures are in contact via the Ga-to-Ga interface, the Ga within the reservoirs forms a continuous entity. Therefore, the maximum adhesion is dictated by either the tensile strength of solid Ga or the failure of the enclosing structures. This yielded a very strong maximum adhesion: we calculated a theoretical maximum of 36 N based on a tensile strength of 15 MPa, but our experimental set-up failed above 15.7 N, preventing precise measurement of this proof-of-concept. Meanwhile, the adhesion in the low-adhesion state remained low, as it depended primarily on the cohesion of liquid Ga. Thus, by employing such enclosing structures, a switching ratio of over 18,000 (compared to the PDMS low-adhesion state) was observed, significantly higher than any other published reversible adhesives. This enhancement could be utilized for applications that require very strong attachment and repetitive detachment as long as similar enclosing structures can be employed (e.g. reconfigurable microrobotics).

Figure 6A:
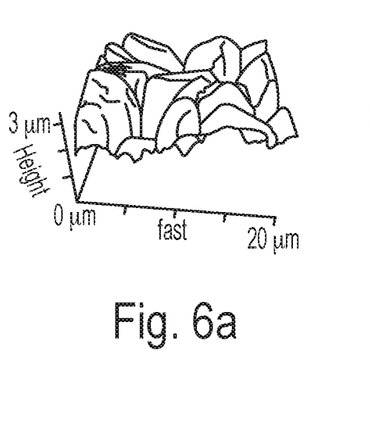
FIG. 6a shows an Asylum atomic force microscope image of a rough glass surface with a root-mean-square roughness of 581.8±3.17 nm.
Figure 6B:
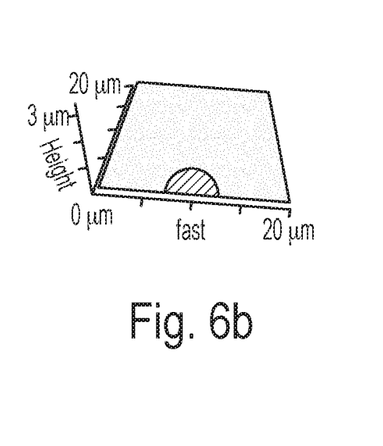
FIG. 6b shows an Asylum atomic force microscope image of a smooth glass surface with a root-mean-square roughness of 3.17±0.287 nm.

FIG. 6: Atomic force microscope images of rough and smooth glass surfaces.

FIG. 6a: An Asylum atomic force microscope image of a rough glass surface with a root-mean-square roughness of 581.8±3.17 nm. This roughness is too high for existing synthetic reversible adhesives.

FIG. 6b: An Asylum atomic force microscope image of a smooth glass surface, which has a root-mean-square roughness of 3.17±0.287 nm. This roughness is typically workable for existing synthetic reversible.

Figure 7:
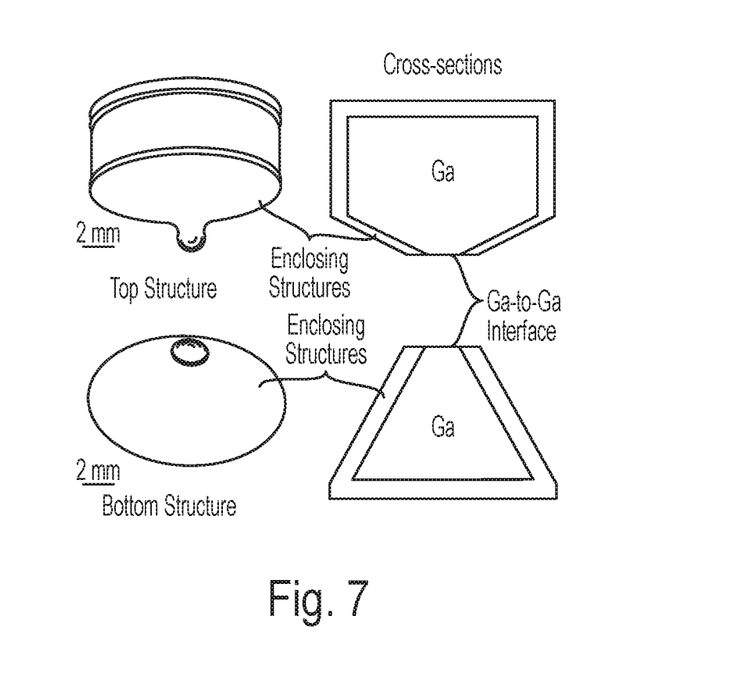
FIG. 7 shows a special enclosing structure with a Ga-to-Ga interface.

FIG. 7: Enhancing the switching ratio of objects by using special enclosing structures with a Ga-to-Ga interface. The bonded objects are shown on the left, where each object is an enclosing structure, which contains a reservoir of Ga that exposes a small opening of liquid Ga. When the opening of two of these structures came into contact, they form a Ga-to-Ga interface. By solidifying the Ga when the structures are in contact, the Ga within the reservoirs forms a continuous entity—yielding a very strong adhesion. The reservoir of Ga within the enclosing structures can be seen from the cross-sectional on the right. Experiments are conducted to evaluate the switching ratio and maximum adhesion between these two enclosing structures, where the "Bottom Structure" is fixed to the ground while the "Top Structure" is attached to the z-axis stage shown in FIG. 4.

Figure 8A:
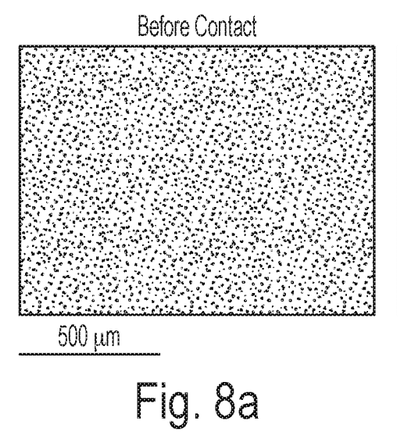
FIG. 8a shows a microscopic image of a PDMS surface before contact with a Ga sample.
Figure 8B:
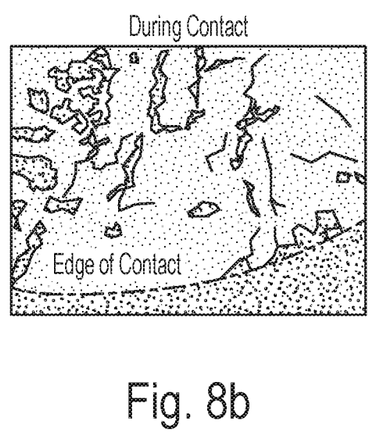
FIG. 8b shows a microscopic image of a PDMS surface during contact with a Ga sample.
Figure 8C:
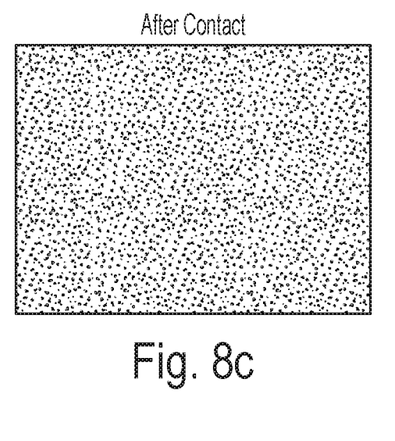
FIG. 8c shows a microscopic image of a PDMS surface after contact with a Ga sample.

FIG. 8: Microscopic images of a PDMS surface (contact interface) during adhesion test in the low-adhesion state. No residue has been observed in after the Ga sample was retracted from contact.

FIG. 8a: Shows a microscopic image of a PDMS surface before contact with a Ga sample.

FIG. 8b: Shows a microscopic image of a PDMS surface during contact with a Ga sample.

FIG. 8c: Shows a microscopic image of a PDMS surface after contact with a Ga sample.

The invention claimed is:

1. Method for reversibly attaching a phase changing metal to an object, the method comprising the steps of:
   providing a substrate, made of an elastomer, having at least one surface at which the phase changing metal is attached,
   heating the phase changing metal above a phase changing temperature at which the phase changing metal changes its phase from solid to liquid,
   bringing the phase changing metal into contact with the object, either when the phase changing metal is in the liquid phase or before the phase changing metal is brought into the liquid phase,
   permitting the phase changing metal to cool below the phase changing temperature, whereby the phase changing metal becomes solid and the object and the phase changing metal become attached to each other,
   reheating the phase changing metal above the phase changing temperature to liquefy the phase changing metal,
   removing the substrate from the object, with the phase changing metal separating from the object and remaining with the substrate, and
   using the substrate for handling the phase changing metal while the phase changing metal is attached to the object, and/or to detach the phase changing metal from the object, the substrate being a carrier for the phase changing metal.

2. The method in accordance with claim 1,
   wherein the phase changing metal has the form of a droplet and is brought in this form into contact with the object.

3. The method in accordance with claim 1, the method further comprising the step of:
   exposing the phase changing metal to oxygen to allow the forming of an oxide layer as a surface layer around the phase changing metal.

4. The method in accordance with claim 1,
   wherein the phase changing metal has a surface layer and wherein the phase changing metal is brought into contact with the object in such a way that the surface layer is in contact with the object.

5. The method in accordance with claim 4,
   wherein the surface layer is an oxide layer.

6. The method in accordance with claim 1, comprising the further step of:
   restricting the contact pressure applied to the phase changing metal between the substrate and the object to a level ensuring the phase changing metal separates fully from the object.

7. The method in accordance with claim 1,
   wherein the phase changing metal is actively cooled below the phase changing temperature or cooled only by exposure to the environment.

8. The method in accordance with claim 1, further comprising the steps of:
   providing the substrate and a reservoir of the phase changing metal in the liquid phase,
   dipping at least the surface of the substrate into the reservoir, and
   removing the substrate from the reservoir to obtain the substrate with the phase changing metal being attached at the surface of the substrate.

9. The method in accordance with claim 1, wherein the step of using the substrate for handling the phase changing metal is carried out prior to attaching the phase changing metal to the object.

10. The method in accordance with claim 1,
    wherein the substrate and the phase changing metal are not separated from each other.

11. The method in accordance with claim 10,
    wherein the substrate and the phase changing metal are not separated from each other after the phase changing metal has been brought into contact with the object.

12. The method in accordance with claim 1,
    wherein at least one of the substrate and the object is selected such that in the liquid phase of the phase changing metal the bonding force between the phase changing metal and the object is smaller than the bonding force between the phase changing metal and the substrate.

13. The method in accordance with claim 1,
    wherein the phase changing temperature of the phase changing metal is above 27° C. or above 29° C.

14. The method in accordance with claim 13,
    wherein the phase changing temperature of the phase changing metal is below 35° C. or 40° C.

15. The method in accordance with claim 1,
    wherein the phase changing metal is one of Ga, a composition which comprises Ga and Gain.

16. The method in accordance with claim 1, wherein the phase changing metal is Ga or a composition containing Ga.

* * * * *